INVENTOR.
KENNETH H. RENSHAW
BY Moody and Phillips
ATTORNEYS

Sept. 20, 1966 K. H. RENSHAW 3,274,493

CIRCUIT FOR REMOVING DISTORTION IN A TIME SYNCHRONOUS PHASE MODULATION RECEIVER

Filed June 13, 1963 5 Sheets-Sheet 2

INVENTOR.
KENNETH H. RENSHAW

BY Moody and Phillips
ATTORNEYS

Sept. 20, 1966 K. H. RENSHAW 3,274,493

CIRCUIT FOR REMOVING DISTORTION IN A TIME SYNCHRONOUS PHASE MODULATION RECEIVER

Filed June 13, 1963

5 Sheets-Sheet 3

INVENTOR.
KENNETH H. RENSHAW

BY *Moody and Phillion*

ATTORNEYS

INVENTOR.
KENNETH H. RENSHAW
BY Moody and Phillion
ATTORNEYS

INVENTOR.
KENNETH H. RENSHAW
BY Moody and Phillion
ATTORNEYS

United States Patent Office 3,274,493

Patented Sept. 20, 1966

3,274,493

CIRCUIT FOR REMOVING DISTORTION IN A TIME SYNCHRONOUS PHASE MODULATION RECEIVER

Kenneth H. Renshaw, Costa Mesa, Calif., assignor to Collins Radio Company, Cedar Rapids, Iowa, a corporation of Iowa Filed June 13, 1963, Ser. No. 287,676
5 Claims. (Cl. 325—320)

This invention relates generally to a time-synchronous communication system in which each data bit of information is represented by an equal time portion of a tone signal with the nature of the bit being determined by the phase relationship thereof with respect to the phase of the previous bit, and more specifically to means for removing undesirable phase components that have been carried over into any given bit from the immediately preceding bit, owing to the inability to change the phase of the tone signal instantaneously; i.e., a finite amount of time is required to change the phase of a signal tone so that a small component of a given data bit phase will be carried over into the following segment of tone signal representing the next succeeding bit.

The art of transmitting information by employing time synchronously divided tone signals into different phases to represent information is fairly well developed. In such time-synchronous systems each bit of information is carried on a tone signal and occurs during a given interval of time T, with the intervals of time representing each bit being equal in length and occuring consecutively. The information carried by the tone signal during any given time interval is determined by its phase with respect to some reference phase, usually the phase of the immediately preceding time interval. Each of these short intervals of tone signal is herein defined as a "phasor." Thus, the phase of a given phasor is compared to the phase of the immediately preceding phasor to determine the inforation contained in the given phasor.

As will be described later herein, each tone signal may carry more than one channel of information thereon. For example, if a single channel of information is being carried, a phase difference of 0° or 180° between successive phasors can be used to represent marks and spaces. Thus, a given phasor, arbitrarily defined as having a phase of 0° can represent a mark, and if the next phasor is 180° removed therefrom it will represent a space. If two channels of information are contained on the tone signal, then it is necessary to have four possible phasor positions; each position presenting some combination of a mark or a space of the first channel and a mark or a space of the second channel. These four possible phase positions should be spaced 90° apart to obtain optimum operating conditions. For a detailed discussion of such a system reference is made to U.S. Patent 2,905,812 issued September 22, 1959, to Melvin L. Doelz and Dean F. Babcock and entitled, "High Information Capacitive Phase Pulse Multiplex System."

A system of transmitting information, as described in U.S. Patent 2,905,812, requires a transmitting station and a receiving station. The phasors are generated at the transmitting station by shifting the phase of a given tone signal at periodic intervals in accordance with the bit rate, thus producing a series of phasors each of which has a phase relationship with the immediately preceding phasor to indicate the information stored therein. Such shift in tone signal cannot be accomplished instantaneously, however, due to a certain amount of electrical inertia in the transmitter circuits. A small interval of time is required to completely cut off the tone signal at the end of a first phasor and to establish the new phase of the next succeeding phasor. Thus a small component of the first phasor will be carried over into the second phasor to introduce a measurable amount of distortion. Such distortion is present in each phasor and is transmitted along with the signal to a receiver where decoding occurs. Owing to the fact that the aforementioned system of transmitting information is a high capacity system, it is required that the signal-to-noise ratio be maintained as large as possible. Thus, even the small amount of disortion introduced by the carry-over of a portion of one phasor to the subsequent phasor is of importance.

It is a primary object of this invention is to provide means at the receiver station to eliminate the distortion caused by carry-over, the portion of a given phasor into the next subsequent phasor.

It is another principal object of the invention to improve the signal-to-noise ratio of time-synchronous information transmission systems.

A third object of the invention is the improvement of time-synchronous information receivers, generally.

In some receivers constructed to receive time-synchronous data information, there is provided a pair of keyed filters for each tone signal. Each of said keyed filters is essentially an energy integrator and tuned to the frequency of the tone signal. By proper synchronizing means a given phasor is caused to drive one of the keyed filters at the phase of the given phasor for a period of time slightly less than the time interval T of the received phasor. The keyed filter is then allowed to ring freely for an additional time period T during which the other keyed filter is being driven by the next subsequently received phasor. At the end of the driving period of said other keyed filter, the phase relationships of the signals in the two keyed filters are compared to determine the information represented by the tone signal contained in said other keyed filter. The tone signal is then quenched in the first keyed filter and the third received phasor is caused to drive the first keyed filter during the ringing time of the second keyed filter. At the end of the drive time of the first keyed filter by the third phasor, the phases of the third and second phasors are compared to determine the information contained in the third phasor. Thus, the two keyed filters are used alternately for storing the previously received phasor against which the phase of the currently received phasor is compared to determine the information contained in said currently received phasor.

Each phasor reproduced in the keyed filters, however, contains a small distorting component of the immediately preceding phasor due to the manner of generation thereof at the transmiter, as discussed hereinbefore.

In accordance with the present invention, a small portion of the output signal of each keyed filter, at the end of the driving period and during the ringing period, is inverted and supplied to the input of the other keyed filter substantially during the driving time of said other keyed filter by the next subsequently received phasor. The inverted signal supplied from the output of one of the keyed filters to the input of the other keyed filter is equal to the distorting signal created at the transmitter by carry-over of a given phasor into the next subsequent phasor. Due to the 180° reversal of the signal carried back from the output of one keyed filter to the input of the other keyed filter, the corrective (inverted) signal and the distorting signal will cancel out, thus leaving the phasor substantially free of distortion due to carry-over of a phasor.

The above-mentioned and other objects and features of the invention will be more fully understood from the following detailed description thereof when read in conjunction with the drawing in which:

FIG. 1 represents a block diagram of a means for generating and transmitting phasors of a time-synchronous nature;

FIG. 1*a* shows a vector diagram of the various phasors;

FIGS. 2*a* through 2*k* show waveforms incurred in the generation of the transmitted phasors;

Figure 6:
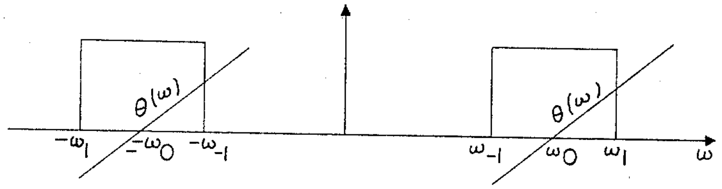
Figure 7:
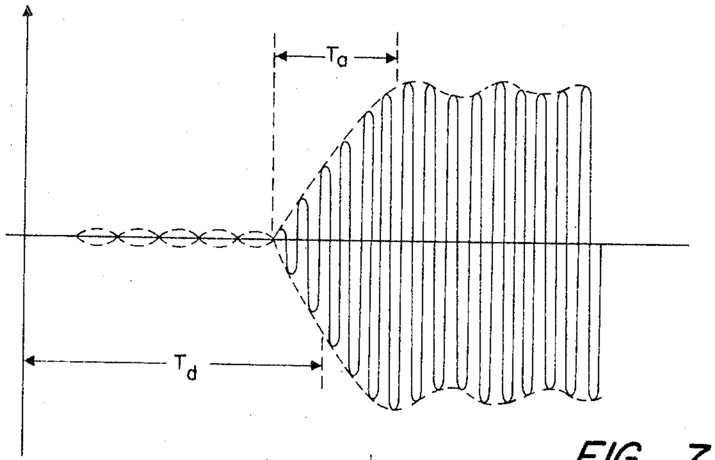
Figure 8:
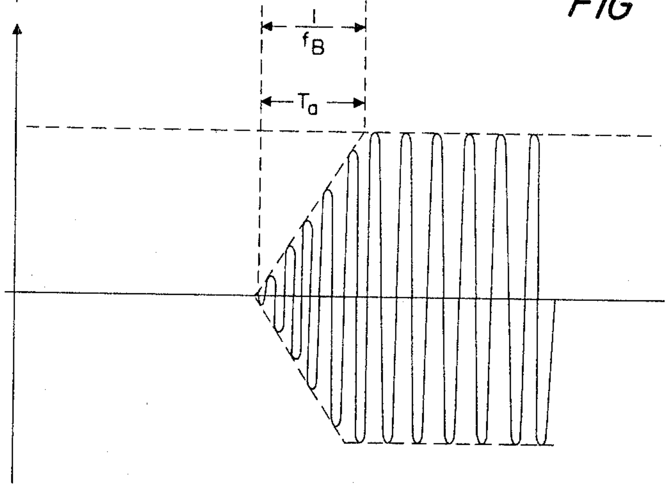

FIGS. 5*a* through 5*j* show waveforms of phasors generated in the keyed filter of the receiver in response to the received phasors and also show the distorting components of a received phasor and the correcting signals generated in the receiver to cancel out the distorting components of said received phasors;

FIGS. 6, 7, and 8 are illustrations to aid in understnading a general discussion contained herein relating to the carry-over of distortive signal from one phasor into the next subsequent phasor during the generation of said phasors at the transmitter.

In the discussion of the invention, there will first be described, generally, the means for generating the phasor at the transmitter. Following, there will be a discussion of the means for receiving the transmitted phasors and for decoding them. Then the structure for cancelling out the distortive portion of the phasors, which forms the essence of this invention, will be described. Subsequently, a general discussion will be made of the nature and causes, from a theoretical standpoint, of the carry-over of portion of one phasor into the subsequent phasor during the generation thereof at the transmitter.

Figure 1:
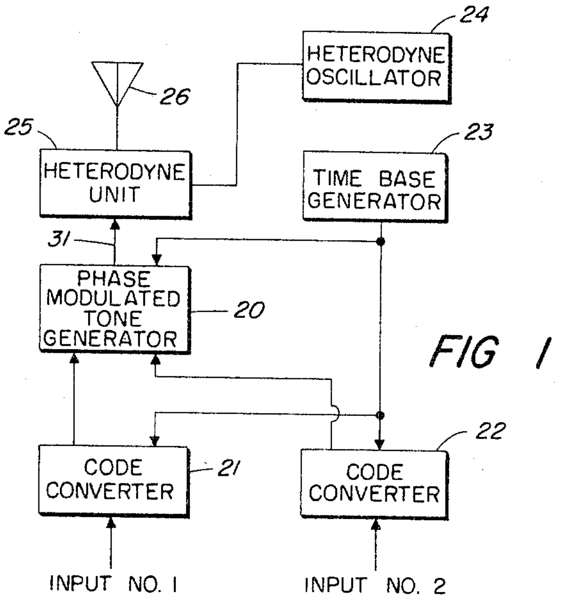
Figure 1A:
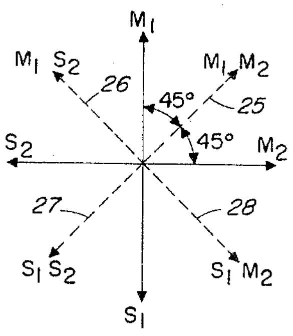

Referring now to FIG. 1, there is shown a block diagram of a system for generating and transmitting any of the phasors 25, 26, 27, or 28, of the vector diagram of FIG. 1*a*. More specifically, the structure of FIG. 1 is capable of transmitting from antenna 26 a tone signal (superimposed upon a suitable carrier), having the phase represented by one of the vectors 25, 26, 27, and 28 of FIG. 1*a*. The four vectors 25 to 28 are positioned 90° apart and each carries two channels of information. For example, vector 25 carries a mark in both channel 1 and channel 2, whereas vector 28 carries a mark in channel 2 and a space in channel 1.

In the operation of FIG. 1, the marks and spaces from channels 1 and 2, usually two-level signals, are supplied to code converters 21 and 22, respectively, which are under control of time base generator 23. The phase modulated tone generator 20 responds to the information supplied thereto from the code converters 21 and 22 and also to the time base generator 23 to produce a phasor whose phase with respect to the prior phasor is determined by the information supplied thereto from the code converters. For example, assume that the tone generator 20 produces a phasor representing a mark in both channel 1 and channel 2 as represented by vector 25 of FIG. 1*a*. Such phasor occurs during the time interval $T_1$ of FIG. 2*a* and is shown as a waveform in FIG. 2*b*.

Subsequently, in response to a mark from channel 1 to code converter 21 and a space from channel 2 to code converter 22, the tone generator 20 will produce the phasor (vector) 26 of FIG. 1*a*. It will be seen that the phasor 26 has been advanced by 90° with respect to phasor 25 and represents a mark in channel 1 and a space in channel 2.

In a similar manner the phase modulated tone generator 20 can produce phasors 27 and 28 which represent a space or a mark in channels 1 or 2 as indicated in FIG. 1*a*. The heterodyne unit 25 functions to modulate the carrier signals supplied by oscillator 24 with the phase modulated tone signal from the generator 20 and to supply said modulator carrier to the transmitting antenna

26. For a more detailed account of the construction and operation of the block diagram of FIG. 1, reference is made to the aforementioned U.S. Patent 2,905,812.

For the purposes of this specification, let it be assumed that the circuit of FIG. 1 is capable of generating the phasors as shown in FIG. 1*a* and represented in other forms in FIGS. 2*a*–2*e*. As mentioned before, FIG. 2*a* simply represents time intervals into which the bits are divided. The time intervals $T_1$, $T_2$, and $T_3$ each represents a frame, are of equal duration, and follow one another consecutively. During time interval $T_1$ the output of generator 20 of FIG. 1 is represented by the phasor 90 shown in FIG. 2*b*. It will be observed that a finite amount of time $t_0$–$t_2$ is required for the phasor of FIG. 2*b* to develop from zero amplitude to its full amplitude. At time $t_3$ quenching of the output signal from the tone generator 20 commences in preparation for initiation of the next phasor, shown in FIG. 2*c*. Quenching, however, is not accomplished immediately, but requires a finite amount of time. In FIG. 2*f*, there is shown a pulse 30 which determines the portion of the signal generated by tone generator 20 permitted to pass to antenna 26. More specifically, the pulse 30 commences at time $t_1$ and terminates at time $t_3$, permitting only that portion of the tone signal generated during time interval $t_1 - t_3$ to be supplied to antenna 26. Such an output signal is represented by waveform 31 of FIG. 2*g*, and is the phasor actually transmitted. It should be noted that the transmitted phasor 31 of FIG. 2*g* is actually a gated portion of the generated phasor 90 of FIG. 2*b*.

As discussed above, a finite time is required for the signal shown in FIG. 2*b* to become quenched entirely. Thus, while the output of the tone generator 20 may be cut off during time interval $t_3 - t_5$, there will remain in the filter circuits of tone generator 20 a remnant of the phasor of FIG. 2*b*. Such remnant is shown as waveform portion 32 in FIG. 2*g* and can be seen to carry over into the next phasor 34 of FIG. 2*h*.

It should be noted that gating pulse 30 or FIG. 2*f* is generated by a different circuit from that which generates the phasors. More specifically, the phasors are generated by a pair of keyed filtered circuits which are used alternately to generate the consecutive phasors. In other words, a first keyed filter can be employed to generate the phasor 90 of FIG. 2*b*, and the second keyed filter can then be employed to generate phasor 91 of FIG. 2*c*. Next, the first keyed filter, which has now been quenched, is used to generate the third phasor 92 of FIG. 2*d*. However, as indicated above, quenching takes a finite amount of time with the result that a small portion of any phasor will overlap into the driving time of the subsequent phasor. Thus, the small portion 32 of the phasor of FIG. 2*f* overlaps into the time interval allotted to the phasor 34 of FIG. 2*h*, which is a gated portion of generated phasor 91 of FIG. 2*c*.

It would be possible, perhaps, to commence quenching earlier during a bit period so that quenching would be completed at the end of the bit period. However, this would result in transmission of a shorter phasor, which would in turn produce a degraded signal-to-noise ratio.

Figure 3:
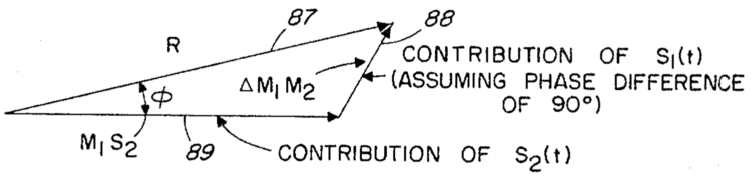
FIG. 3 is another vector diagram showing the distorting effect of a small portion of a given phasor carrying over into a subsequently generated phasor.

The phasor 91 shown in FIG. 2*c* has arbitrarily been assumed to represent a mark in channel 1 and a space in channel 2. Referring to FIG. 3 there is shown a vector diagram representing the phasor 89 of FIG. 2*c* plus the distorting component 88 carried over from the phasor of FIG. 2*b*. As can be seen from the diagram of FIG. 1*a*, the vectors 25 and 26 representing data information $M_1$, $M_2$, and $M_1$, $S_2$, respectively, are 90° apart, so that the corresponding vectors 88, 89 of FIG. 3 are 135° (90°+45°) apart. The resultant vector 87 is seen to have a phase distortion measured by the angle $\phi$. It is this phase distortion that the invention corrects. The specific structure constituting the invention is contained in the receiver discussed later herein.

Figure 2:
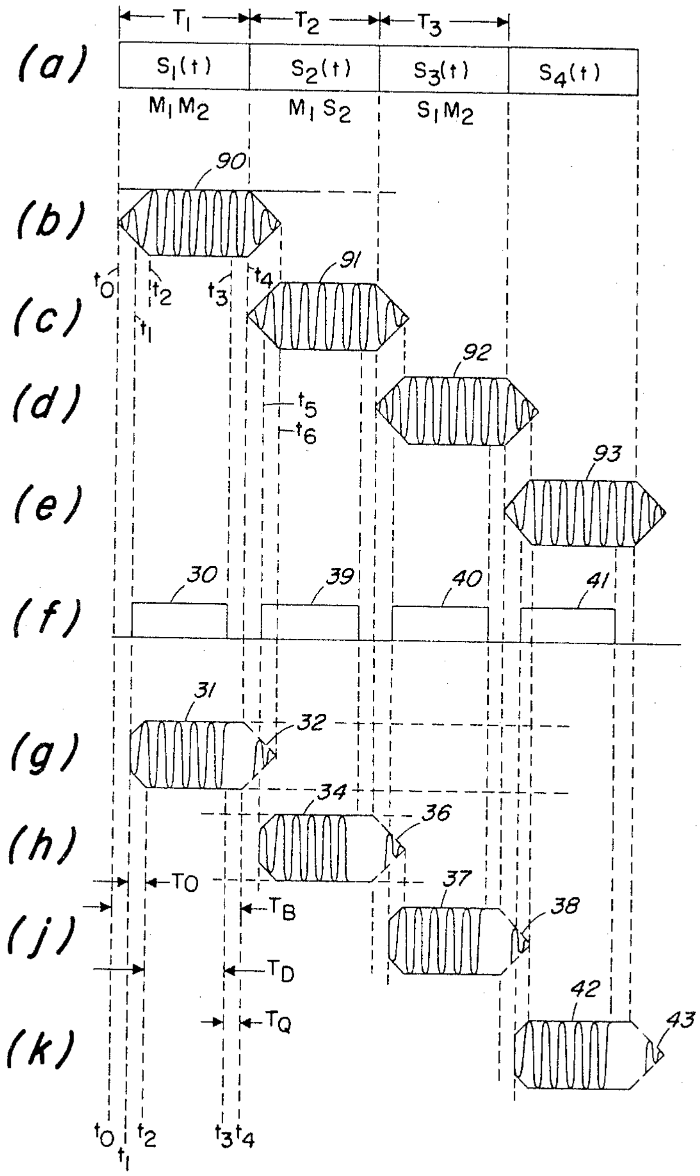

Referring again briefly to the voltage waveforms of FIG. 2, the transmitted phasors 34, 37, and 42 of bit periods $T_2$, $T_3$, and $T_4$, are gated from the pulse bursts of FIGS. 2*c*, 2*d*, and 2*e*, respectively. Associated with each of the transmitted phasors 34, 37, and 42 is a small portion, such as portions 36, 38, and 43 which carry over into the next subsequently transmitted phasor in a manner discussed above.

In FIG. 2 the various time intervals are defined as follows:

$t_2-t_3$=drive time
$t_0-t_4$=bit length
$t_1-t_2$=carry-over or overlap period
$t_3-t_4$=quench time In the generation of the phasors shown in FIG. 1*a*, the information carried in each phasor is determined by the relation of its phase to that of the immediately preceding phasor. Thus, each phasor becomes a reference to the next phasor. For example, in FIG. 1*a* the first phasor 25 has for its phase reference the phasor identified as $M_2$. The phasor 25 then becomes the phase reference for the next phasor generated and shown in FIG. 2*c*. In becoming the reference for the next phasor 26 (FIG. 1*a*) the phasor 25 assumes the reference position (i.e., the position held by vector $M_2$ in FIG. 1*a*), so that the phase difference between phasors 25 and 26 is 135°. In other words, each time a phasor is generated, such phasor becomes a reference phase and the entire vector diagram of FIG. 1*a* shifts so that the prior phasor assumes the 0° phase position shown in FIG. 1*a* as vector $M_2$. Thus, each phasor serves two functions. Firstly, it represents information determined by a phase reference which, in this structure, is the phase of the immediately preceding phasor. Secondly, each phasor will in its turn become the phase reference and in FIG. 1*a* the reference phase is measured from the vector marked $M_2$. Thus, the third phasor shown in FIG. 2*d* and represented by vector 28 of FIG. 1*a* will have a phase advanced from the phase of the preceding phasor 26 by 315°.

At the receiver end the vectors are decoded in the following manner. The first phasor received, as represented by the vector 25 of FIG. 1*a*, is advanced 45° from the reference phase (i.e., the previous phasor which is not specifically shown) and when compared with said reference phase in a phase detector will be shown to be less than 90°, thus falling either in the first or fourth quadrant, both of which indicate a mark in the second channel. To determine the information contained in the first channel, the received phasor 25 is advanced 90° into the fourth quadrant and again compared with the reference phase. Such second comparison will show that a mark is present in channel 1 since the phase difference between the reference phase and the 90° advanced phasor 25 is less than 90°.

In other words, to determine the information in channel 2 the received phasor is compared directly with the phase of the reference vector, but to determine the information contained in channel 1 the received phasor must be advanced 90° and then compared with the reference phase. For a more detailed discussion of the theory of operation of a receiver, reference is made to the above entitled U.S. Patent 2,905,812.

Figure 4:
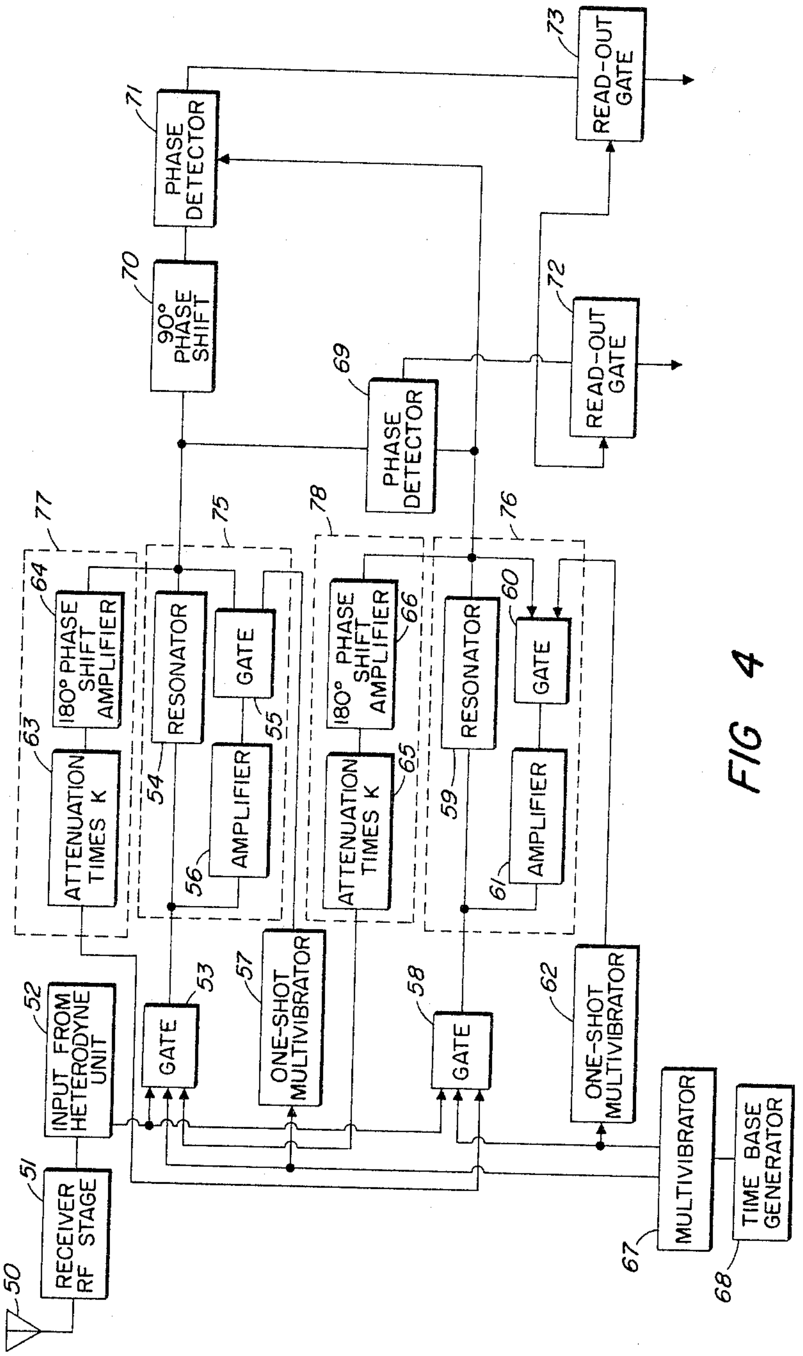
FIG. 4 is a block diagram of a receiver which may be employed to receive the type of information generated by the structure of FIG. 1.

Referring now to FIG. 4, there is shown a general block diagram of a receiver for the phasor generated by the circuit of FIG. 1. The signal is received by an R.-F. stage 51 and supplied to heterodyne unit 52. From the heterodyne unit 52, the phasors are ultimately supplied to a pair of keyed filters 75 and 76 through gates 53 and 58. The two keyed filters 75 and 76 are energy integrators and function to receive alternate phasors. More specifically, while one keyed filter is receiving a phasor the other keyed filter is resonating at the frequency and phase of the previously received phasor and functions as a storage device. Thus, the phase of the received phasor can be compared to the phase of the stored phasor to determine the information contained therein. The stored phasor is then quenched in time to receive the third phasor with the second received phasor now being stored in the other keyed filter. The phase of the third received phasor is compared with the stored second phasor to determine the information contained in said third phasor. Such process continues as long as phasors are being received. The gating of phasors, alternately, into keyed filters 75 and 76 is accomplished by means of "and" gates 53 and 58 which are actuated by the output signals of multivibrator 67, which in turn is controlled by time base generator 68.

Each of the keyed filters 75 and 76 has a feedback circuit for quenching purposes. More specifically, keyed filter 75 comprises an amplifier 56 and a gate 55 which responds to the output of one-shot multivibrator 57 at the end of a storage or ringing period to permit negative feedback, thus quenching the signal present in resonator 54. Similarly, gate 60 is responsive to the output from the one-shot multivibrator 62 to pass a signal through amplifier 61 to resonator 59 to quench the signal therein at the end of the storage or ringing period.

The outputs of both resonators 54 and 59 are supplied to phase detector 69 which responds thereto to produce a D.-C. signal whose polarity indicates the presence of a mark or a space in channel 2. The outputs of resonators 59 and 54 are also supplied to phase detector 71 but with the output of resonator 54 being supplied thereto through 90° phase shift circuit 70. As discussed hereinbefore, the effect of a 90° phase circuit 70 is to produce a phase relationship between the two signals supplied to phase detector 71 whereby the output signal of phase detector 71 will be a D.-C. voltage whose polarity indicates the presence of a mark or a space in channel 1 during the phasor being received.

As discussed above, each of the received phasors contain a small portion of the immediately preceding phasor which constitutes distortion. To correct for such distortion, there is provided the circuits contained in blocks 63, 64, 65, and 66 of FIG. 4.

The phase distortion present in any currently received phasor is of the same phase as the stored or ringing signal in the other keyed filter since the stored phasor is the immediately preceding phasor from which the distorting signal originated. Thus, assuming that resonator 59 has just entered its ringing period and the resonator 54 is just beginning to receive a new phasor, the output signal from resonator 59 is supplied back to the input of resonator 54 through a circuit including block 66, block 65, and gate 53. The block 66 is a 180° phase shift circuit and the block 65 contains an attenuation circuit so the correcting signal supplied through gate 53 to resonator 54 is an attenuated signal having a phase 180° removed from the phase of the ringing signal stored in resonator 59. Such feedback signal is caused to contain an amount of energy which is equal to the amount of distortive energy introdduced into the phasor being received by resonator 54 as a carry-over from the preceding phasor. Since the corrective feedback signal and the distorting signal are of equal energy content, they will cancel out at the input of resonator 54.

Similarly, when resonator 54 is acting as a storage or reference phase and resonator 59 is just beginning to receive a phasor, a portion of the output signal from resonator 54 will be inverted by inverter 64, attenuated by attenuator 63, and then supplied back to the input of resonator 59 to cancel out that distortive portion of the preceding phasor carried over into the currently received phasor.

Figure 5:
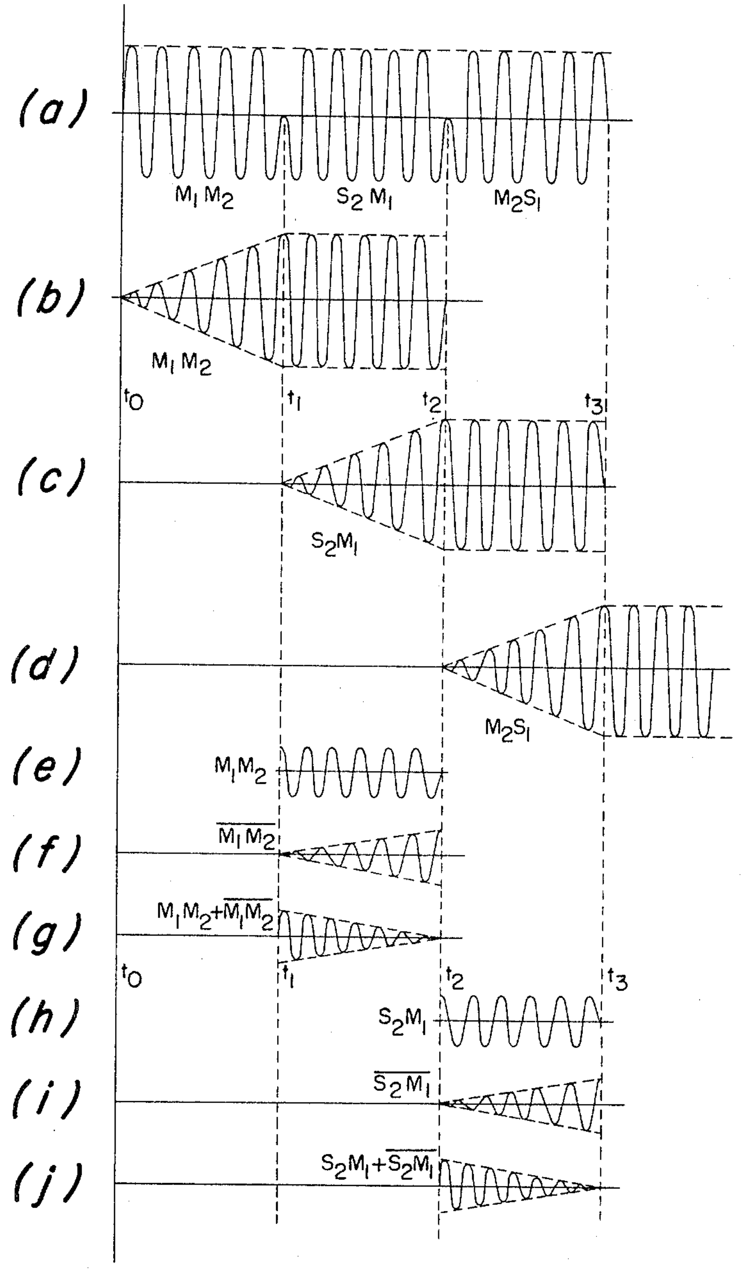

The waveforms of FIGS. 5*a* through 5*j* illustrate the foregoing cancellation of phase distortion. Assume that during the time period $t_0-t_1$ the resonator 54 of FIG. 4 is driven by the phasor of FIG. 5*b* with the result that the amplitude of oscillation in resonator 54 will increase substantially linearly until time $t_1$ when the driving pulse is terminated, i.e., when gate 53 is turned off. The resonator 54 will then continue to ring for a period $t_1-t_2$, during which time it will act as a storage element and provide the reference phase for the next received phasor, shown in FIG. 5*c*. During the time period $t_1-t_2$, resonator 59 is driven by the phasor of FIG. 5C until time $t_2$ when the gate 58 is closed. Just prior to the closing of the gate 58 the phase of the signal of FIG. 5*c* is compared with the phase of the phasor of FIG. 5*b* which is stored in resonator 54. Such phase comparison is made both in phase detector 69 and in phase detector 71 to recover the information contained in both channels 1 and 2. The phasor of FIG. 5*b* has been drawn to represent (arbitrarily) marks in both channels 1 and 2, and the phasor of FIG 5*c* has been drawn to represent a mark in channel 1 and a space in channel 2. The phasor shown in FIG. 5*d* represents a space in channel 1 and a mark in channel 2.

At time $t_2$ the phasor of FIG. 5*b* stored in resonator 65 is quenched so that it can receive the new phasor shown in FIG. 5*d*. The new phasor of FIG. 5*d* is caused to drive a resonator 54 for the time period $t_2-t_3$. Just before time $t_3$ the phases of the waveforms of FIGS. 5*c* and 5*d* are compared in phase detectors 69 and 71 to recover the information of channels 1 and 2 contained in the phasor of FIG. 5*d*.

In FIG. 5*e* there is shown the distortive component of the phasor of FIG. 5*b* which is carried over into the phasor of FIG. 5*c*. Since the distortive component can be defined as a definite quantity of energy, it does not increase in amplitude as does the phasor of FIG. 5*c*, but rather remains a constant energy distortive component. In FIG. 5*f* there is shown the corrective signal which is supplied back from the resonator 54 to the resonator 59 of FIG. 4 to correct for the distortive component of FIG. 5*e*. The waveform of FIG. 5*f* is inverted by the inverter 64 of FIG. 4 and does increase in amplitude during the driving period since it is supplied to the resonator 59 all during the time interval $t_1-t_2$. Thus, the total energy of the corrective signal (as represented by the amplitude) increases substantially with time as shown in FIG. 5*f*. At time $t_2$ the amplitudes of the waveforms of FIG. 5*e* and 5*f* are equal which means that the energy contents of the two signals are the same and cancellation of the distortive component is effected. Thus, during the ringing period $t_2-t_3$ of the phasor of FIG. 5*c* there remains no distortive component from the phasor of FIG. 5*b*. FIG. 5*g* simply shows the summation of the waveforms of FIG. 5*e* and 5*f*.

In a similar manner the waveforms of FIGS. 5*h*, 5*j*, and 5*k* show the distortive component and the corrective signal associated with the phasors of FIGS. 5*c* and 5*d*. More specifically, the waveform of FIG. 5*h* represents the distortive component carried over from the phasor of FIG. 5*c* to the phasor of FIG. 5*d*. The waveform of FIG. 5*j* represents the corrective signal supplied from resonator 59 to resonator 54 through the feedback circuit 78 to correct for the distortive component of FIG. 5*h*. FIG. 5*k* again represents a summation of the waveforms of FIGS. 5*h* and 5*j*.

In many equipments of the type described herein, where more than one tone signal frequency is employed, the individual tone spectrum is narrow compared to the channel bandwidth, except for the highest and the lowest tone signals. Consequently, for the tone signals other than the highest and the lowest it can be assumed that optimum matched filter operation is obtained. However, for single tone data systems of the type to which this invention is directed, the effect of bandwidth limitation is of interest. Because of bandwidth limitations, the matched filter is no longer optimum.

In analyzing the effect of band-limiting on such a single tone data at the transmitter end, a primary assumption is made that the ideal bandpass filter has characteristics, as shown in FIG. 6. The cut-off frequencies are $\omega_{+1}$ and $\omega_0$ is the midband frequency. Within the passband the phase shift $\theta$ may be expressed by the following relationship:

$$\theta=(\omega-\omega_0)t_d \qquad (1)$$

It can be shown that the response of such a filter to a step function modulated wave of frequency $\omega_0$ is:

$$e(t)=Re\left[\frac{EKe^{j\omega_0 td}}{2\pi j}\int_{\omega_{-1}}^{\omega_1}\frac{e^{j\omega(t-td)}d\omega}{\omega-\omega_0}\right] \qquad (2)$$

which evaluates to the following expression:

$$e(t)=EK\left[\frac{1}{2}+\frac{1}{\pi}Si\frac{(\omega_1-\omega_{-1}}{2}(t-td)\right]\cos\omega_0 t \qquad (3)$$

Assumed linear rise time will be the same as the slope of the envelope function shown in FIG. 7. The slope is the same as a tangent to the envelope function at time $T=T_d$, the point where the envelope is half its final amplitude. By similar argument the fall time of a sine wave which is suddenly turned off can be shown to be $T_a$. The superpositioning or combining of such waveforms can be employed to analyze the effect of band limiting on the single tone data system described herein.

FIG. 2*a* represents graphically the time intervals allotted to each phasor as it is generated at the transmitter. $S_1(t)$ represents a sine wave of frequency $\omega_0$ and of phase $\phi_1 \cdot S_2(t)$ represents a sine wave of frequency of $\omega_0$ and of phase $\phi_2$. The transmitted binary data is represented by the phase difference between $\phi_1$ and $\phi_2$. If the rise time of the waveform shown in FIG. 8 is assumed, the band-limited signal can be thought of as the linear combination of the waveforms shown in FIGS. 2*b* plus 2*c* during the time interval $t_4-t_6$, as discussed hereinbefore. Intersymbol interference, or carry-over, between $S_1(t)$ and $S_2(t)$ occurs for a period $1/f_B$ where $f_B$ is the filter bandwidth represented in FIG. 6. In FIGS. 2*b* and 2*c*, $1/f_B$ is equal to the time interval $t_4-t_5$. The resultant waveform, as discussed hereinbefore, contains energy from both $S_1(t)$ and $S_2(t)$ as a result of the band limiting. To analyze the effect of the intersymbol interference the relative amount of energy at the end of the integration time must be calculated. The symbols used are as defined in FIGS. 2*h*, 2*j*, and 2*k*. For $t_0>t>t_2$, the envelope functions of $S_1(t)$ and $S_2(t)$ are assumed to be:

$$\left.\begin{aligned}S_1(t)&=\left(1-\frac{t}{t_2-t_0}\right)\cos(\omega_0 t+\phi_1)\\ S_2(t)&=\left(\frac{t}{t_2-t_0}\right)\cos(\omega_0 t+\phi_2)\end{aligned}\right\}t_0<t<t_2 \qquad (5)$$

$$\left.\begin{aligned}S_1(t)&=0\\ S(t)&=\cos(\omega_0 t+\phi_2)\end{aligned}\right\}t_2<t<t_3 \qquad (6)$$

At time $t_6$ the energy in the filter at the transmitter is the resultant of the contribution of both $S_1(t)$ and $S_2(t)$. This is shown by vector 87 of FIG. 3. The exact amount of the intereference can be calculated and, as can be seen from resultant vector 87, has both an ampltude and phase error.

It is to be noted that the form of the invention herein shown and described is but a preferred embodiment thereof and that various changes may be made therein without departing from the spirit or the scope of the invention.

I claim:

1. In a receiver for receiving time synchronous phasors in which a small portion of each phasor has been carried over into the next succeeding phasor owing to the inherent inability to change phase instantaneously, said receiver comprising:

a pair of resonator means tuned to the phasor frequency, means for generating timing signals at the bit rate of the received phasors, gating means responsive to the timing signals to drive said pair of resonator means alternately with the received phasors, each of said resonator means being constructed to ring during the phasor period immediately following the driving period thereof, and means for quenching each of said pair of resonator means at the end of their ringing periods, feedback means connecting the output of each of the resonator means to the input of the other resonator means during the driving period of said other resonator means, said feedback means constructed to cancel out the distorting carry-over portion of the phasor immediately preceding the phasor driving said other resonator means.

2. A receiver in accordance with claim 1 which each of said feedback means comprises an attenuation circuit to attenuate the signal fed back by an amount necessary to cause the total energy of the signal fed back to equal the total energy of the carry-over portion of the phasor preceding the driving phasor.

3. A receiver in accordance with claim 2 in which each of said feed-back means comprises means for shifting the phase of the signal fed back by an amount 180° removed from the phase of said carry-over portion.

4. In a receiver for receiving time synchronous phasors, the phase of each phasor with respect to a reference phase representing the information contained therein and a small portion of each phasor having been carried over into the next succeeding phasor owing to the inherent inability to change phase instantaneously, said receiver comprising:

a pair of keyed filter means tuned to the phasor frequency, timing means for generating timing signals at the bit rate of the received phasors, gating means responsive to said timing signals to drive said keyed filter means alternately with the received phasors, each of said keyed filter means being constructed to ring during a substantial portion of the phasor period immediately following the driving phasor period, and, means for quenching said keyed filter means at the end of their ringing periods, feedback means connecting the output of each of the keyed filter means to the input of the other keyed filter means during the driving period of said other keyed means, said feedback means including inversion means and attenuation means to produce a feedback signal which will cancel out the distortive carry-over portion of the phasor immediately preceding the phasor driving said other keyed filter means.

5. A receiver in accordance with claim 4 in which said attenuation means is constructed to cause the total energy in the signal fed back to equal the total energy of said carry-over portion, and in which said inversion means comprises means for changing the phase of the signal fed back by an amount 180° removed from the phase of said carry-over portion.

References Cited by the Examiner

UNITED STATES PATENTS

| | | | |
|---|---|---|---|
| 2,905,812 | 9/1959 | Doelz | 325—47 |
| 3,131,258 | 4/1964 | O'Neill | 325—320 X |
| 3,189,826 | 6/1965 | Mitchell | 325—320 X |
| 3,222,454 | 12/1965 | Losee | 178—88 |

DAVID G. REDINBAUGH, *Primary Examiner.*

S. J. GLASSMAN, *Assistant Examiner.*

UNITED STATES PATENT OFFICE

CERTIFICATE OF CORRECTION

Patent No. 3,274,493 September 20, 1966

Kenneth H. Renshaw

It is hereby certified that error appears in the above numbered patent requiring correction and that the said Letters Patent should read as corrected below.

Column 9, line 12, for "claim 1" read -- claim 1 in --; column 10, line 11, after "keyed" insert -- filter --.

Signed and sealed this 1st day of August 1967.

(SEAL)
Attest:

Edward M. Fletcher, Jr.
Attesting Officer

EDWARD J. BRENNER
Commissioner of Patents